United States Patent [19]
Ikeda et al.

[11] Patent Number: 5,769,316
[45] Date of Patent: Jun. 23, 1998

[54] AIR CONDITIONER FOR VEHICLES

[75] Inventors: Susumu Ikeda; Toshimi Isobe; Atsuo Inoue, all of Isesaki; Toshihiko Fujita, Sawa-gun; Akihiro Tajiri, Wako; Mitsuru Ishikawa, Wako; Choji Sakuma, Wako; Nobuyuki Yuri, Wako, all of Japan

[73] Assignees: Honda Giken Kogyo Kabushiki Kaisha, Tokyo; Sanden Corporation, Gunma, both of Japan

[21] Appl. No.: 855,154

[22] Filed: May 13, 1997

Related U.S. Application Data

[63] Continuation of Ser. No. 478,240, Jun. 7, 1995, abandoned.

[30] Foreign Application Priority Data

Jul. 6, 1994 [JP] Japan .................................... 6-155025

[51] Int. Cl.$^6$ ..................................................... F25B 30/02
[52] U.S. Cl. ................................ 237/2 B; 62/160; 236/38
[58] Field of Search ............................... 237/2 B; 62/244, 62/324.1, 160, 180, 181; 236/38, 11

[56] References Cited

U.S. PATENT DOCUMENTS

| | | | |
|---|---|---|---|
| 4,441,901 | 4/1984 | Endoh | 62/181 |
| 4,518,032 | 5/1985 | Funasaki et al. | 236/38 X |
| 4,615,481 | 10/1986 | Tanaami et al. | 236/38 |
| 4,860,552 | 8/1989 | Beckey | 237/2 B X |
| 4,866,944 | 9/1989 | Yamazaki et al. | 62/160 |
| 5,410,149 | 4/1995 | Hara et al. | 62/160 |
| 5,467,606 | 11/1995 | Sasaki et al. | 62/160 |

*Primary Examiner*—William E. Tapolcal
*Attorney, Agent, or Firm*—Lyon & Lyon LLP

[57] ABSTRACT

An air conditioner for a vehicle has a heat pump type refrigerant circuit capable of operating at least in a heating mode. The air conditioner comprises a motor fan for supplying air heated by a heat exchanger to the interior of the vehicle during operation of the heating mode, a sensor for detecting the temperature of the air at a position downstream of the heat exchanger and a control unit for controlling the volume of the air supplied by the motor fan to a predetermined minimum volume by controlling the drive of the motor fan when the detected air temperature is lower than a predetermined temperature. Even in a condition where a sufficiently large heat radiation from the heat exchanger cannot be expected, a large volume of cold air that has been insufficiently heated can be prevented from being discharged into the interior of the vehicle. Because the motor fan is driven at a condition of minimum air volume even when the detected temperature is lower than the predetermined temperature, a rapid variation of air volume caused at the time of changing a fan-stopping condition to a fan-driving condition can be avoided and an abnormal increase in the discharge pressure of the heat pump compressor can be prevented.

12 Claims, 3 Drawing Sheets

FIG. I

AIR CONDITIONER FOR VEHICLES

This application is a Continuation Application of application Ser. No. 08/478,240, filed on Jun. 7, 1995, now abandoned.

BACKGROUND OF THE INVENTION

1. Field of the Invention

The present invention relates to an improved air conditioner for vehicles capable of performing a heating operation using a heat pump type refrigerant circuit.

2. Description of the Related Art

In a conventional air conditioner for vehicles which can operate at least in a heating mode using a heat pump type refrigerant circuit, air is heated by a heat exchanger provided in the heat pump type refrigerant circuit and the heated air is sent to the interior of the vehicle by a motor fan for performing a heating operation.

In such a conventional air conditioner, however, because usually a constant volume of the air is blown out in spite of the degree of heating ability of the heat exchanger, in a condition where the temperature of the heat exchanger is low, for example, a sufficiently great heat radiation from the heat exchanger cannot be expected because of its operation immediately after the start of heating or a low temperature of the atmosphere, cold air that has been insufficiently heated is sent to the interior of the vehicle.

In order to solve such a problem, a control system for stopping the operation of the motor fan and preventing the cold air from being blown out when the temperature of the heat exchanger is lower than a predetermined temperature has been proposed. Even in such a control system, however, there remain problems that the air volume rapidly varies at the time of changing from the air stopping condition to an air supplying condition and that the discharge pressure of refrigerant from a compressor provided in the refrigerant circuit is likely to abnormally increase and the control of the rotational speed of the compressor becomes difficult by stopping the motor fan because the temperature of the discharged refrigerant increases quickly in a heat pump type refrigerant circuit.

SUMMARY OF THE INVENTION

It is an object of the present invention to provide an air conditioner for vehicles which can adequately control the ability of air supplying depending upon the heating condition of a heat exchanger and which can prevent a discharge of cold air and a rapid variation of air volume.

To accomplish the above object, an air conditioner for a vehicle according to the present invention has a heat pump type refrigerant circuit capable of operating at least in a heating mode. The air conditioner comprises means for supplying air heated by a heat exchanger to the interior of the vehicle during operation in the heating mode, means for detecting the temperature of the air at a position downstream of the heat exchanger in the flow direction of the air and means for controlling the volume of the air supplied by the air supplying means to a predetermined minimum volume by controlling the drive of the air supplying means when the temperature of the air detected by the air temperature detecting means is lower than a first predetermined temperature.

Although the volume of the air supplied by the air supplying means is not particularly restricted when the temperature of the air detected by the air temperature detecting means is not lower than the first predetermined temperature, for example, the air volume is controlled as follows.

The air volume is controlled in proportion to the temperature of the air detected by the air temperature detecting means when the detected air temperature is not lower than the first predetermined temperature. Further, the air volume may be controlled to a volume of not greater than a predetermined maximum volume, for example, in proportion to the predetermined maximum volume, when the detected air temperature is not lower than a second predetermined temperature higher than the first predetermined temperature.

Furthermore, although the above-described control of air volume to the predetermined minimum volume may be conducted only during operation of heating mode in the present invention, the control may be conducted during both the operation of heating mode and the operation of dry heating mode.

In the air conditioner according to the present invention, when the temperature of the air is lower than the first predetermined temperature, the volume of the air supplied by the air supplying means is controlled to the predetermined minimum volume by controlling the drive of the air supplying means. Namely, in a state where a sufficiently great heat radiation from the heat exchanger cannot be expected because of the operation immediately after the start of heating or a low temperature of the atmosphere, the air supplying means is driven so that the volume of the air supplied by the air supplying means is controlled to the predetermined minimum volume, thereby preventing a large volume of cold air from discharged into the interior of the vehicle.

Further, because the air supplying means is continuously driven without being stopped, even in a condition of a low-temperature air being discharged, the minimum volume of air can be maintained, whereby a rapid variation in air volume can be prevented which has been a problem in a conventional system, and the occurrence of an abnormally high discharge pressure at the compressor caused by stopping the air supplying means can be avoided.

Further objects, features, and advantages of the present invention will be understood from the detailed description of the preferred embodiment of the present invention with reference to the appropriate figures.

BRIEF DESCRIPTION OF THE DRAWINGS

A preferred exemplary embodiment of the invention will now be described with reference to the appropriate figures, which is given by way of example only, and is not intended to limit the present invention.

DETAILED DESCRIPTION OF THE PREFERRED EMBODIMENTS

Figure 1:
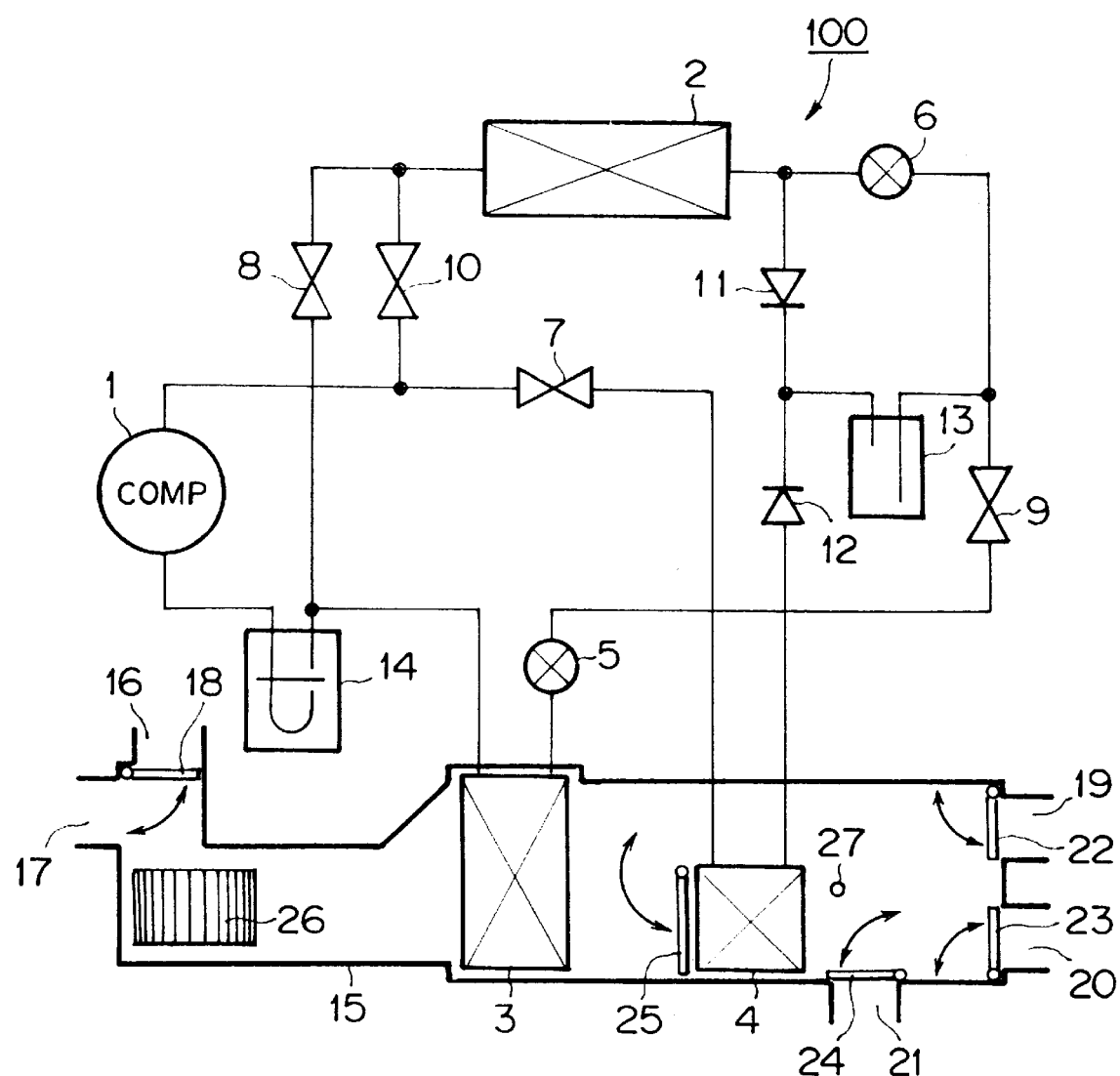
FIG. 1 is a schematic view including a refrigerant circuit diagram of an air conditioner for vehicles according to an embodiment of the present invention.

Referring to FIG. 1, an air conditioner 100 for a vehicle having a heat pump type refrigerant circuit is provided according to a preferred embodiment of the present invention. Air conditioner 100 includes a variable displacement motor compressor 1, an external heat exchanger 2 provided outside of a duct 15 through which the air for air conditioning is sent to an interior of the vehicle, and a first internal heat exchanger 3 and a second internal heat exchanger 4 provided inside of the duct 15.

The discharge port of compressor 1 is connected to one port of the external heat exchanger 2 via a fourth solenoid valve 10, and the other port of the external heat exchanger 2 is connected to the inlet of a receiver 13 via a first check valve 11. The outlet of receiver 13 is connected to one port of a first internal heat exchanger 3 via a third solenoid valve 9 and a first expansion valve 5. The other port of first internal heat exchanger 3 is connected to the inlet of an accumulator 14, and the outlet of the accumulator 14 is connected to the suction port of compressor 1.

Further, the discharge port of compressor 1 is connected to one port of a second internal heat exchanger 4 via a first solenoid valve 7, and the other port of the second internal heat exchanger 4 is connected to the inlet of receiver 13 via a second check valve 12. A second expansion valve 6 is provided between the outlet of receiver 13 and the other port of external heat exchanger 2. A second solenoid valve 8 is provided between one port of external heat exchanger 2 and the inlet of accumulator 14.

Duct 15 has an outside-air inlet port 16 and an inside-air inlet port 17. The balance between outside air and inside air to be drawn into the duct 15 is adjusted by a switching damper 18. A motor fan 26 is provided in duct 15 as an air supplying means for supplying the incoming air to the interior of the vehicle. In duct 15, the first internal heat exchanger 3 and second internal heat exchanger 4 are arranged in this order in the flow direction of air, and an air mixing damper 25 is provided immediately upstream of the second internal heat exchanger 4. A temperature sensor 27 such as a thermistor is provided at a position downstream of the second internal heat exchanger 4 as means for detecting the temperature (Tm) of the air supplied by motor fan 26 that has passed through first and second internal heat exchangers 3 and 4. The temperature (Tm) of the air corresponds to the temperature of air discharged from duct 15 into the interior of the vehicle.

The discharge ports of duct 15 comprise a vent port 19, a foot port 20 and a defroster port 21. A damper 22 opens and closes vent port 19, a damper 23 opens and closes foot port 20 and a damper 24 opens and closes defroster port 21.

Figure 2:
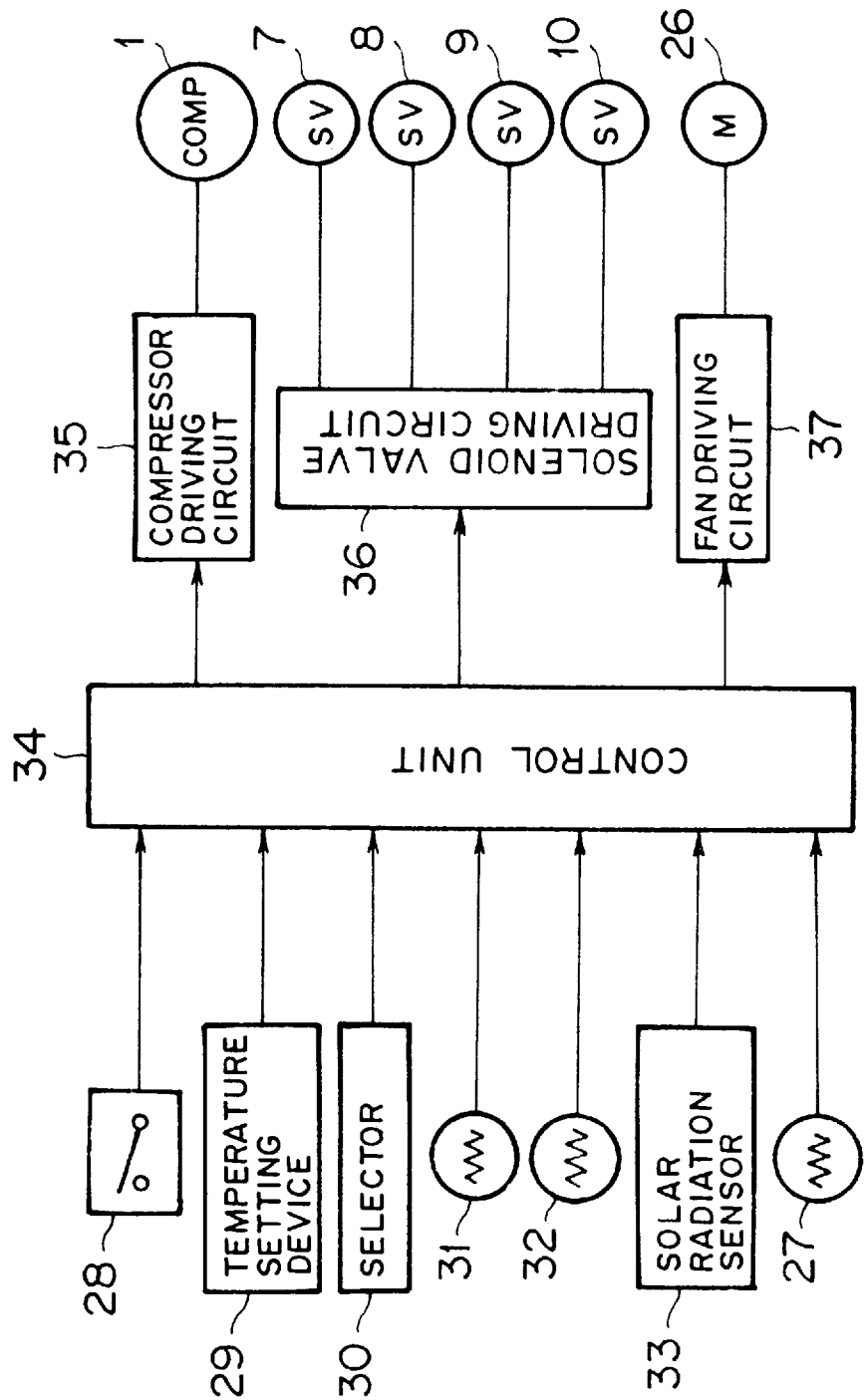
FIG. 2 is a block diagram of a control circuit of the air conditioner shown in FIG. 1.

FIG. 2 shows a control circuit for the above-described air conditioner 100. An air conditioner switch 28, a conditioning temperature setting device 29 and a selector 30 for selecting an air supplying mode are connected to a control unit 34 (such as a microcomputer). Air conditioner switch 28 initiates the operation of the air conditioning. Conditioning temperature setting device 29 has a lever or buttons for setting an air temperature to be controlled, and the temperature for air conditioning can be appropriately selected and set by the operation of the conditioning temperature setting device 29. Selector 30 for selecting an air supplying mode has a variable lever capable of changing the volume of air and capable of selecting an "OFF" position and an "AUTO" position (automatic control mode). The air volume can be changed in multiple stages or continuously by the operation of the variable lever, and the air volume can be automatically controlled by control unit 34 when the lever is switched to the position of "AUTO".

The signals from a temperature sensor 31 for detecting the temperature of inside air, a temperature sensor 32 for detecting the temperature of outside air, a solar radiation sensor 33 such as a photosensor and the aforementioned temperature sensor 27 for detecting the temperature of discharge air are supplied to control unit 34.

Control unit 34 has a CPU, ROMs, RAMs, etc., and programs for the control of the rotational speed of compressor 1 and the control of switching conditions of the solenoid valves as well as a program for the control of air volume described later are stored in the ROMs. This control unit 34 sends control signals to a compressor driving circuit 35, a solenoid valve driving circuit 36 and a fan driving circuit 37, respectively, in response to the operation signals of temperature setting device 29 and selector 30, and the detected signals of temperature sensors 32 and 33, solar radiation sensor 33 and temperature sensor 27. Compressor driving circuit 35 controls the rotational speed of compressor 1 in response to the rotational-speed signal sent from control unit 34. Solenoid valve driving circuit 36 controls the opening and closing operations of the respective solenoid valves 7 to 10 in response to the mode signals sent from control unit 34 for switching the refrigerant cycle in the refrigerant circuit. Fan driving circuit 37 controls the volume of air supplied by motor fan 26 in response to the air volume signal sent from control unit 34.

In the air conditioner, any one of a cooling mode, a dry cooling mode, a heating mode and a dry heating mode can be selected by switching the refrigerant cycle by operation of the first to fourth solenoid valves 7 to 10. Each air conditioning mode can be automatically selected and started by control unit 34 based on the set temperature and the detected values of inside-air temperature, outside-air temperature, solar radiation, etc.

The operation of the respective solenoid valves 7 to 10 is controlled depending upon the respective selected modes as shown in the following table.

| Mode | First solenoid valve 7 | Second solenoid valve 8 | Third solenoid valve 9 | Fourth solenoid valve 10 |
| --- | --- | --- | --- | --- |
| Cooling | OFF | OFF | ON | ON |
| Dry cooling | ON | OFF | ON | ON |
| Heating | ON | ON | ON | OFF |
| Dry heating | ON | OFF | ON | OFF |

In the operation in the cooling mode, the first and second solenoid valves 7 and 8 are closed and the third and fourth solenoid valves 9 and 10 are opened. In such a condition, compressor 1 and motor fan 26 are driven. The refrigerant discharged from compressor 1 flows to external heat exchanger 2 through the fourth solenoid valve 10 and is condensed therein. The condensed refrigerant flows to the first expansion valve 5 and the first internal heat exchanger 3 through the first check valve 11, receiver 13 and the third solenoid valve 9 and is evaporated therein. The evaporated refrigerant flows to accumulator 14 and thereafter is drawn into compressor 1.

In this cooling mode, the cooling of the interior of the vehicle can be performed utilizing the heat-absorbing action of the refrigerant at the first internal heat exchanger 3.

In the operation in the dry cooling mode, the first, third and fourth solenoid valves 7, 9 and 10 are opened and the second solenoid valve 8 is closed, and in such a condition, compressor 1 and motor fan 26 are driven. A part of the refrigerant discharged from compressor 1 flows to external heat exchanger 2 through the fourth solenoid valve 10 and is condensed therein. The condensed refrigerant then flows to the first expansion valve 5 and the first internal heat exchanger 3 through the first check valve 11, receiver 13 and the third solenoid valve 9 and is evaporated therein, and the evaporated refrigerant is drawn into the compressor 1 through accumulator 14. The remaining part of the refrigerant discharged from compressor 1 flows to the second internal heat exchanger 4 through the first solenoid valve 7 and is condensed therein, and the condensed refrigerant joins the above-described refrigerant after passing through the second check valve 12.

In this dry cooling mode, the heat-absorbing action of the refrigerant at the first internal heat exchanger 3 and the radiating action at the second internal heat exchanger 4 are both utilized, and the dehumidification of the interior of the vehicle can be performed without being accompanied by a drop in the temperature of the discharged air utilizing both actions. Further, at that time, the temperature and the amount of dehumidification can be controlled by adjusting the discharge capacity of compressor 1 and adjusting the opening degree of air mixing damper 25. External heat exchanger 2 radiates any excess heat caused by a condition of near zero opening degree of air mixing damper 25 (that is, the volume of air passing through the second internal heat exchanger 4 is zero or nearly equal to zero), thereby maintaining a proper balance between the heat-absorbing action and the radiating action.

In the operation in the heating mode, the first, second and third solenoid valves 7, 8 and 9 are opened and the fourth solenoid valve 10 is closed, and in such a condition, compressor 1 and motor fan 26 are driven. The refrigerant discharged from compressor 1 flows to the second internal heat exchanger 4 through the first solenoid valve 7 and is condensed therein. The condensed refrigerant is diverged after passing through the second check valve 12 and receiver 13, and one portion of the diverged refrigerant flows to the first expansion valve 5 and the first internal heat exchanger 3 through the third solenoid valve 9 and is evaporated therein, and then the evaporated refrigerant is drawn into the compressor 1 through accumulator 14. The other portion of the diverged refrigerant flows to the second expansion valve 6 and external heat exchanger 2 and is evaporated therein, and then the evaporated refrigerant joins the above-described refrigerant at the inlet portion of accumulator 14 after passing through the second solenoid valve 8.

In this heating mode, the interior of the vehicle can be heated utilizing the radiating action of the refrigerant at the second internal heat exchanger 4 as well as the interior of the vehicle can be dehumidified utilizing the heat-absorbing action of the refrigerant at external heat exchanger 2 and the first internal heat exchanger 3. Further, the heating ability and the amount of dehumidification can be controlled by adjusting the discharge capacity of compressor 1 and adjusting the opening degree of air mixing damper 25.

In the operation in the dry heating mode, the first and third solenoid valves 7 and 9 are opened and the second and fourth solenoid valves 8 and 10 are closed, and in such a condition, compressor 1 and motor fan 26 are driven. The refrigerant discharged from compressor 1 flows to the second internal heat exchanger 4 through the first solenoid valve 7 and is condensed therein. The condensed refrigerant flows to the first expansion valve 5 and the first internal heat exchanger 3 through the second check valve 12, receiver 13 and the third solenoid valve 9 and is evaporated therein, and then the evaporated refrigerant is drawn into the compressor 1 through accumulator 14.

In this dry heating mode, the interior of the vehicle can be heated utilizing the radiating action of the refrigerant at the second internal heat exchanger 4 as well as the interior of the vehicle can be dehumidified utilizing the heat-absorbing action of the refrigerant at the first internal heat exchanger 3. Further, the heating ability and the amount of dehumidification can be controlled by adjusting the discharge capacity of compressor 1 and adjusting the opening degree of air mixing damper 25.

Figure 3:
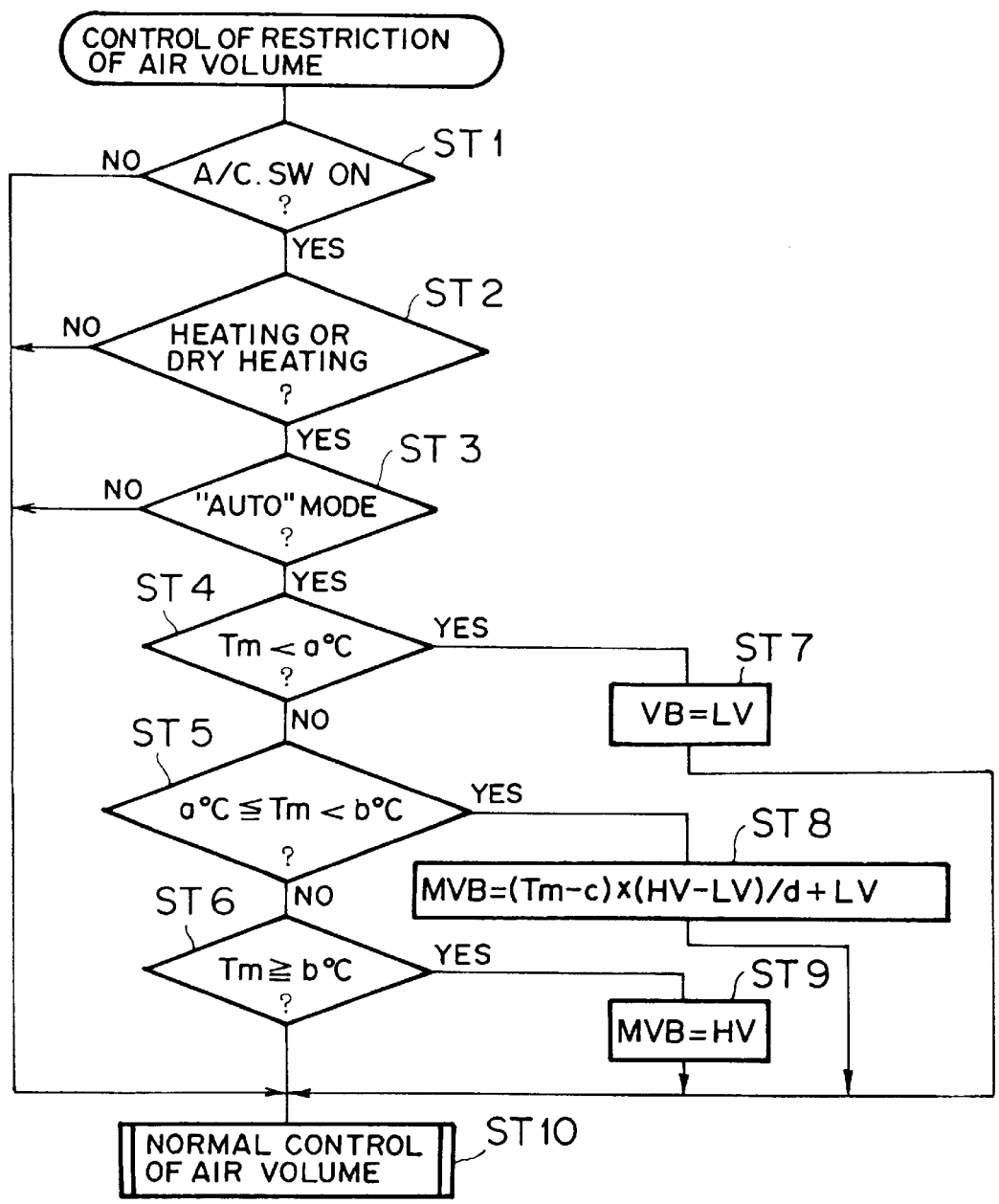
FIG. 3 is a flowchart showing steps for control of the air volume in the air conditioner shown in FIG. 1.

Next, the control of the air volume conducted in the heating mode and the dry heating mode will be explained with reference to FIG. 3 showing an example of a program flow for the control.

Firstly, it is determined whether air conditioner switch 28 is switched "ON" at step ST1. When air conditioner switch 28 is "ON", it is determined whether heating mode or dry heating mode is selected or not at step ST2. When heating mode or dry heating mode is selected, it is determined whether "AUTO" mode is selected as air supply mode at step ST3. In the case where the air conditioner switch 28 is not switched "ON", the cooling mode or dry cooling mode is selected as the operation mode or the volume of air is set by the variable lever, i.e., the determination at steps ST1, ST2 or ST3 is "NO", the following steps for the control of air volume are not performed.

When the operation mode is heating mode or dry heating mode and the selected air supply mode is "AUTO" mode, it is determined that the discharge air temperature "Tm" detected by temperature sensor 27 is in which range among a range of Tm<a° C., a range of a° C.≦Tm<b° C. and a range of Tm≧b° C. at steps ST4 to ST6, where, the temperature "a° C." is a predetermined lower limit (a first predetermined temperature) and the temperature "b° C." is a predetermined upper limit (a second predetermined temperature) for determination of air temperature.

Figure 4:
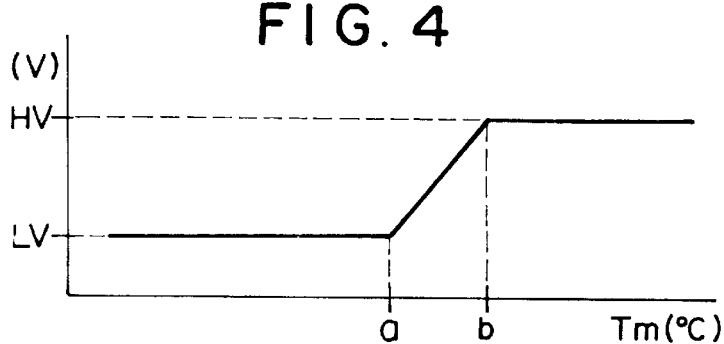
FIG. 4 is a graph showing the relationship between the temperature of the discharged air and the voltage applied to the air supplying means in the air conditioner shown in FIG. 1.

Also as shown in FIG. 4, when the discharge air temperature "Tm" is lower than the predetermined lower limit "a° C.", a voltage "VB" applied to motor fan 26 under a normal control condition of air volume due to control unit 34 is determined to be a predetermined low level value "LV" volts (V) at step ST7. When the discharge air temperature "Tm" is not lower than the predetermined lower limit "a° C." but is lower than the predetermined upper limit "b° C.", a maximum voltage "MVB" capable of being applied to motor fan 26 under a normal control condition of air volume due to control unit 34 is calculated by the equation: MVB= (Tm−c)×(HV−LV)/d+LV at step ST8, where, "HV" is a predetermined high level value, "c" is a temperature correction factor, and "d" is a constant. When the discharge air temperature "Tm" is not lower than the predetermined upper limit "b° C.", a maximum voltage "MVB" capable of being applied to motor fan 26 under a normal control condition of air volume due to control unit 34 is determined to be the predetermined high level value "HV" volts (V) at step ST9. The relationship between discharge air temperature "Tm" and voltage (V) is shown by FIG. 4 with the respective values of HV, LV, a and b and the above-described determinations are illustrated by the solid line.

After the above-described determination, the flow proceeds to the normal control of air volume due to control unit 34 (step ST 10). In the control, when the discharge air temperature "Tm" is lower than the predetermined lower limit "a° C.", the voltage applied to motor fan 26 is fixed at the predetermined low level value "LV" volts (V) and a low volume of air (a predetermined minimum volume of air) is supplied, that is, a weak flow of air is discharged into the vehicle interior. When the discharge air temperature "Tm" is not lower than the predetermined lower limit "a° C." but is lower than the predetermined upper limit "b° C.", the voltage applied to motor fan 26 is appropriately controlled between the low level value "LV" and the calculated maximum value "MVB". In this control between a° C. and b° C., it is preferred that the voltage to be applied to motor fan 26 (this corresponds to air volume to be supplied) is controlled in proportion to the detected discharge air temperature "Tm". Further, when the discharge air temperature "Tm" is not lower than the predetermined upper limit "b° C.", the voltage applied to motor fan 26 is appropriately controlled between the low level value "LV" and the calculated maximum value "MVB" (the high level value "HV").

Thus, in this embodiment, when the operation mode is set at heating mode or dry heating mode and the air supplying mode is set at "AUTO" mode, respectively, the air supplying ability of motor fan 26 (air volume due to the motor fan 26) can be adequately controlled by controlling or restricting the voltage and the range of the voltage applied to the motor fan 26 depending upon the air temperature "Tm" after passing through the second internal heat exchanger 4.

Therefore, even in a condition where a sufficiently great heat radiation from the second internal heat exchanger 4 cannot be expected because of the operation immediately after the start of heating or a low temperature of the atmosphere, the air supplying ability of motor fan 26 is restricted depending upon the temperature "Tm" of the air after passing through the second internal heat exchanger 4, and a large volume of cold air that has been insufficiently heated can be prevented from being discharged into the interior of the vehicle.

Further, since motor fan 26 is driven at a condition of a minimum air volume even when the detected temperature "Tm" is lower than the lower limit "a° C.", the drive of the motor fan 26 can be maintained without being stopped. Therefore, a rapid variation of air volume which is a problem in a conventional system can be avoided, and an abnormal increase of the discharge pressure of compressor 1 caused by the stopping of motor fan 26 can also be avoided.

Furthermore, because the control of the air supplying ability of motor fan 26 is performed in proportion to the detected air temperature "Tm" in this preferred embodiment, an air volume conforming to the heat radiation ability of the second internal heat exchanger 4 can be appropriately selected.

Although the control for automatically changing the ability of motor fan 26 is performed only when the air supplying mode is set to "AUTO" mode in this preferred embodiment, this control can be performed at conditions other than the "AUTO" mode. For example, if the air volume adjusted by the variable lever is set at an upper limit and a lower limit is appropriately set based on the upper limit, a control similar to the above-described control can be performed within the range of the lower limit to the upper limit.

The control according to the present invention can be applied not only to the apparatus of the above-described embodiment but also to various air conditioners for vehicles as long as the air conditioners can operate at least in a heating mode.

Although a preferred embodiment of the present invention has been described in detail herein, the invention is not limited thereto. It will be appreciated by those skilled in the art that various modifications may be made without materially departing from the novel and advantageous teachings of the invention. Accordingly, the embodiment disclosed herein is by way of example only. It is to be understood that the scope of the invention is not to be limited thereby, but is to be determined by the claims which follow.

What is claimed is:

1. An air conditioner for a vehicle, comprising:
    a heat pump refrigerant circuit having a compressor for compressing a refrigerant, a first heat exchanger for condensing the refrigerant, means for reducing the pressure of the condensed refrigerant and a second heat exchanger for evaporating the refrigerant and absorbing heat from ambient air by the evaporation of the refrigerant while operating in a vehicle heating mode;
    means for supplying air heated by said first heat exchanger to an interior of said vehicle during operation of said heating mode;
    means for detecting a temperature of said heated air at a position downstream of said first heat exchanger in a flow direction of said heated air; and
    means for controlling the volume of said heated air supplied to said interior of said vehicle by said air supplying means in the heating mode to a predetermined constant minimum volume of heated air by controlling a drive of said air supplying means when the temperature of said heated air detected by aid air temperature detecting means is lower than a first predetermined temperature.

2. The air conditioner for a vehicle according to claim 1, wherein said volume of said heated air supplied by said air supplying means is controlled in proportion to said temperature of said heated air detected by said air temperature detecting means when the detected air temperature is higher than said first predetermined temperature.

3. The air conditioner for a vehicle according to claim 1, wherein said volume of said heated air supplied by said air supplying means is controlled to a volume of less than a predetermined maximum volume when said temperature of said heated air detected by said air temperature detecting means is lower than a second predetermined temperature, said second predetermined temperature being higher than said first predetermined temperature.

4. The air conditioner for a vehicle according to claim 1, wherein said air conditioner has a selector for selecting an air supplying control mode and said air volume control is performed only when said selector is set at an automatic air supplying control mode.

5. The air conditioner for a vehicle according to claim 3, wherein said volume of said air supplied by said heated air supplying means is controlled in proportion to aid temperature of said heated air detected by said air temperature detecting means when the detected air temperature is higher than said first predetermined temperature and lower than said second predetermined temperature.

6. An air conditioner for a vehicle having a heat pump type refrigerant circuit capable of operating at least in a heating mode and a dry heating mode comprising:
    means for supplying air heated by a heat exchanger to an interior of said vehicle during operation of said heating mode;
    means for detecting a temperature of said air at a position downstream of said heat exchanger in a flow direction of said air; and means for controlling the volume of said air supplied by said air supplying means to a predetermined minimum volume during operation of said heating mode and during operation of said dry heating mode when the temperature of said air detected by said air temperature detecting means is lower than a first predetermined temperature.

7. The air conditioner for a vehicle according to claim 4, wherein said volume of said air supplied by said air supplying means is controlled to a volume of less than a predetermined maximum volume when said temperature of said air detected by said air temperature detecting means is lower than a second predetermined temperature, said second predetermined temperature being higher than said first predetermined temperature.

8. An air conditioner for a vehicle having a heat pump refrigerant circuit for operating in a heating mode and a dry heating mode comprising:

means for supplying air heated by a heat exchanger of the heat pump refrigerant circuit to an interior of said vehicle during operation of one of said heating mode and said dry heating mode;

means for detecting a temperature of said air at a location downstream, in a direction of flow of said air, of said heat exchanger; and means for controlling volume of said air supplied by said air supplying means to a predetermined minimum volume during operation of said heating mode and during operation of said dry heating mode when the temperature of said air detected by said air temperature detecting means is lower than a first predetermined temperature.

9. The air conditioner for a vehicle according to claim 4, wherein said air conditioner has a selector for selecting an air supplying control mode and said air volume control is performed only when said selector is set at an automatic air supplying control mode.

10. The air conditioner for a vehicle according to claim 4, wherein said volume of said air supplied by said air supplying means is controlled in proportion to said temperature of said air detected by said air temperature detecting means when the detected air temperature is higher than said first predetermined temperature.

11. The air conditioner for a vehicle according to claim 4, wherein said volume of said air supplied by said air supplying means is controlled to a predetermined maximum volume when said temperature of said air detected by said air temperature detecting means is higher than a second predetermined temperature, said second predetermined temperature being higher than said first predetermined temperature, and wherein said volume of said air supplied by said air supplying means is controlled in proportion to said detected temperature in a range of temperatures between said first and second predetermined temperatures.

12. An air conditioner for a vehicle comprising:

a heat pump refrigerant circuit having a compressor and first and second the exchangers mounted in the vehicle; said compressor compressing and supplying a refrigerant to said first heat exchanger, said first heat exchanger cooling and condensing the refrigerant, means for reducing the pressure of the refrigerant entering said second heat exchanger, and said second heat exchanger heating and evaporating the refrigerant while operating in a vehicle heating mode;

means for supplying only ambient air to said second heat exchanger for causing the heating and evaporation of the refrigerant;

fan means for supplying air heated by said first heat exchanger caused by cooling and condensing the refrigerant, to an interior of the vehicle during operation of said heating mode;

means for detecting a temperature of said heated air at a position downstream of said first heat exchanger in a flow direction of said heated air; and means for controlling the volume of said heated air supplied to said interior of said vehicle by said fan means in the heating mode to a predetermined constant minimum volume of heated air by controlling a drive of said fan means when the temperature of said heated air detected by said air temperature detecting means is lower than a first predetermined temperature.

* * * * *

UNITED STATES PATENT AND TRADEMARK OFFICE
CERTIFICATE OF CORRECTION

PATENT NO. : 5,769,316
DATED : June 23, 1998
INVENTOR(S) : Ikeda et al.

It is certified that error appears in the above-identified patent and that said Letters Patent is hereby corrected as shown below:

<u>Title page,</u>
Item [56], References Cited, change the reference "5,410,149" to read -- 5,419,149 --.

<u>Column 8,</u>
Lines 24 and 47, change "aid" to read -- said --.

Signed and Sealed this

Sixth Day of August, 2002

Attest:

JAMES E. ROGAN
Attesting Officer
Director of the United States Patent and Trademark Office